(12) United States Patent
Cocuzza et al.

(10) Patent No.: US 11,138,548 B2
(45) Date of Patent: Oct. 5, 2021

(54) DELIVERY PLATFORM VERIFICATION AND MANAGEMENT

(71) Applicant: International Business Machines Corporation, Armonk, NY (US)

(72) Inventors: Anthony M. Cocuzza, Poughkeepsie, NY (US); Yuk L. Chan, Rochester, NY (US); Janice M. Young, White Plains, NY (US); Nancy S. Tilley, High Falls, NY (US); Michael D. Essenmacher, Danbury, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 368 days.

(21) Appl. No.: 16/201,133

(22) Filed: Nov. 27, 2018

(65) Prior Publication Data
US 2020/0167723 A1 May 28, 2020

(51) Int. Cl.
*G06Q 10/08* (2012.01)
*G01S 19/51* (2010.01)
*G06Q 50/26* (2012.01)

(52) U.S. Cl.
CPC .......... *G06Q 10/0833* (2013.01); *G01S 19/51* (2013.01); *G06Q 50/265* (2013.01)

(58) Field of Classification Search
CPC ... G06Q 10/0833; G06Q 50/265; G01S 19/51
See application file for complete search history.

(56) References Cited

U.S. PATENT DOCUMENTS

| | | | |
|---|---|---|---|
| 9,701,408 B1* | 7/2017 | Willison | G08G 5/025 |
| 2010/0215212 A1* | 8/2010 | Flakes, Jr. | G06K 9/00637 |
| | | | 382/100 |

(Continued)

FOREIGN PATENT DOCUMENTS

| | | | | |
|---|---|---|---|---|
| CN | 107491913 A | | 12/2017 | |
| WO | WO 2017/100579 A1 * | | 6/2017 | B64C 39/02 |

OTHER PUBLICATIONS

Henry Jr, Richard, In Flight Image Processing on Multi-Rotor Aircraft for Autonomous Landing, Saint Louis University, 2015.*

(Continued)

*Primary Examiner* — Nathan Erb
(74) *Attorney, Agent, or Firm* — Cantor Colburn LLP; Teddi Maranzano

(57) ABSTRACT

Examples of techniques for delivery platform verification and management are described herein. An aspect includes receiving a unit mailing address and first global positioning system (GPS) coordinates, the unit mailing address and the first GPS coordinates being associated with a delivery platform, from a computing device. Another aspect includes, based on receiving the unit mailing address and first GPS coordinates, dispatching a first inspection drone to the delivery platform based on the first GPS coordinates. Another aspect includes receiving second GPS coordinates associated with the delivery platform from the first inspection drone. Another aspect includes associating the second GPS coordinates with the unit mailing address in an entry corresponding to the delivery platform in a platform information database.

17 Claims, 9 Drawing Sheets

(56) References Cited

U.S. PATENT DOCUMENTS

| | | | |
|---|---|---|---|
| 2011/0202209 A1* | 8/2011 | Moresve | G05D 1/0684 |
| | | | 701/15 |
| 2015/0266577 A1* | 9/2015 | Jones | G06Q 30/0261 |
| | | | 701/3 |
| 2015/0339933 A1* | 11/2015 | Batla | G08G 5/0039 |
| | | | 701/120 |
| 2016/0300495 A1* | 10/2016 | Kantor | G08G 5/0082 |
| 2016/0376031 A1* | 12/2016 | Michalski | G08G 5/0013 |
| | | | 701/15 |
| 2017/0175413 A1 | 6/2017 | Curlander et al. | |
| 2018/0049575 A1 | 2/2018 | Yamrick | |
| 2020/0175882 A1* | 6/2020 | Singh | G08G 5/045 |

OTHER PUBLICATIONS

CSDG, "High-Rise Drone Landing—An Implausible Idea or the Way of the Future?", httpss://www.theurbandeveloper.com, https://csdg.com, Jul. 2018, 4 pgs.

\* cited by examiner

DELIVERY PLATFORM VERIFICATION AND MANAGEMENT

BACKGROUND

The present techniques relate to drones. More specifically, the techniques relate to delivery platform verification and management.

An aerial drone is an unmanned aircraft, also known as an unmanned aerial vehicle (UAV). Drones are relatively small, lightweight aerial vehicles that are operated either autonomously by onboard computers or by a human operator via remote control. The flight time of a drone is a function of its weight, battery capacity, and operating environment, such as wind. For an autonomous flight, drones may include a global positioning system (GPS) device that guides them along a sequence of waypoints and enables them to return to their launching point.

Drones may carry payloads, such as sensor packages, cameras, or other objects. Drones may be used for distributing packages, e.g., in a commercial setting, or to provide supplies or other needed items in support of non-commercial operations to areas that may be difficult to reach by other types of transportation. The ability to transport goods to consumers by drones may reduce traffic congestion associated with ground transport vehicles. Interest in the commercial use of drones is increasing, as regulations are being crafted to enable commercial drone flights.

SUMMARY

According to an embodiment described herein, a system can include a processor to receive a unit mailing address and first GPS coordinates, the unit mailing address and the first GPS coordinates being associated with a delivery platform, from a computing device. The processor can also, based on receiving the unit mailing address and first GPS coordinates, dispatch a first inspection drone to the delivery platform based on the first GPS coordinates. The processor can also receive second GPS coordinates associated with the delivery platform from the first inspection drone. The processor can also associate the second GPS coordinates with the unit mailing address in an entry corresponding to the delivery platform in a platform information database According to another embodiment described herein, a method can include receiving, via a processor, a unit mailing address and first GPS coordinates, the unit mailing address and the first GPS coordinates being associated with a delivery platform, from a computing device. The method can further include, based on receiving the unit mailing address and first GPS coordinates, dispatching, via the processor, a first inspection drone to the delivery platform based on the first GPS coordinates. The method can further include receiving, via the processor, second GPS coordinates associated with the delivery platform from the first inspection drone. The method can further include associating, via the processor, the second GPS coordinates with the unit mailing address in an entry corresponding to the delivery platform in a platform information database.

According to another embodiment described herein, an apparatus can include a processor to receive a unit mailing address and first GPS coordinates, the unit mailing address and the first GPS coordinates being associated with a delivery platform, from a computing device. The processor can also, based on receiving the unit mailing address and first GPS coordinates, dispatch a first inspection drone to the delivery platform based on the first GPS coordinates. The processor can also receive second GPS coordinates associated with the delivery platform from the first inspection drone. The processor can also associate the second GPS coordinates with the unit mailing address in an entry corresponding to the delivery platform in a platform information database.

DETAILED DESCRIPTION

Figure 1:
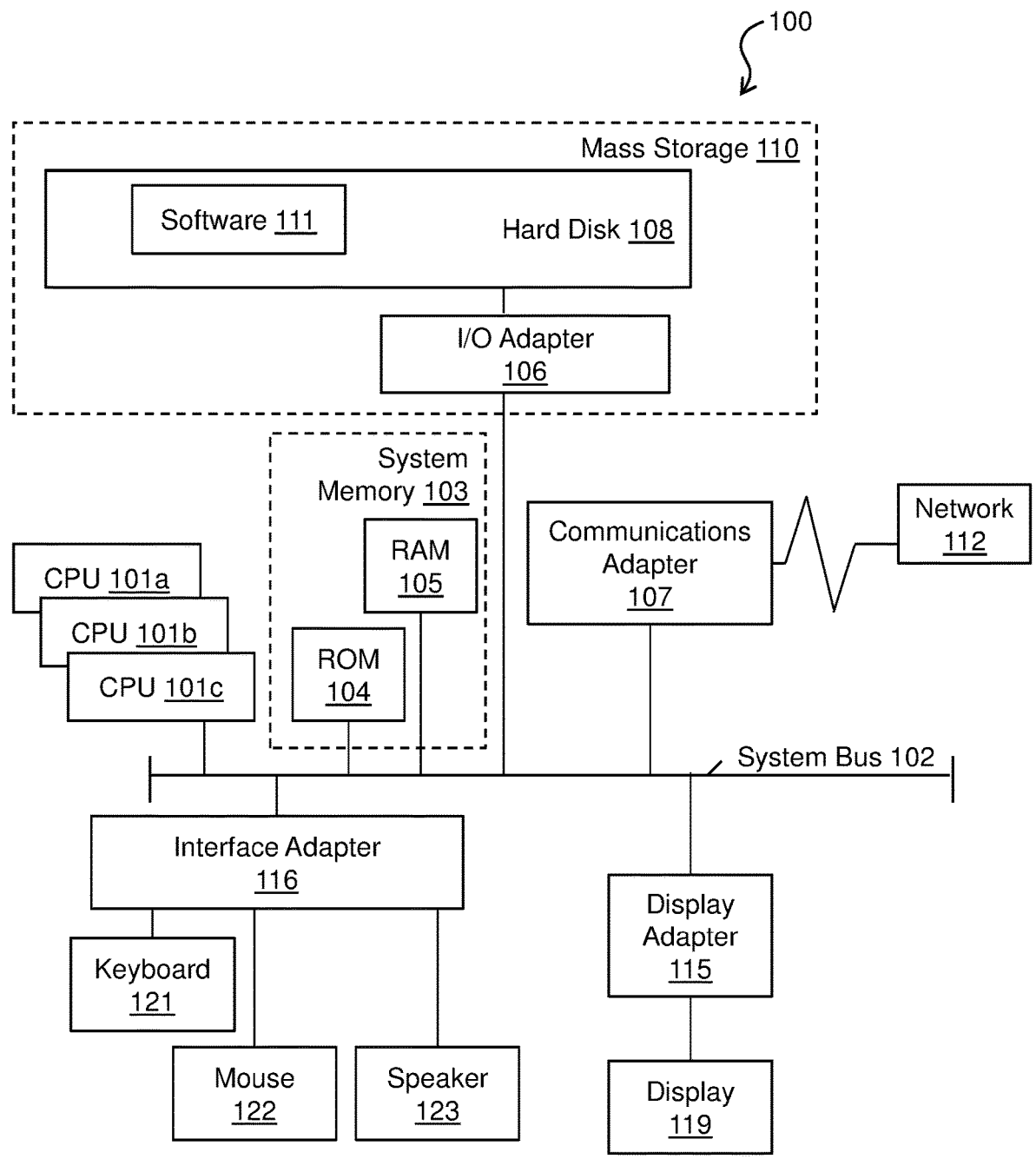
FIG. 1 is a block diagram of an example computer system for delivery platform verification and management.

Embodiments of delivery platform verification and management are provided, with exemplary embodiments being discussed below in detail. Delivery of cargo to an individual unit (e.g., an apartment or an office) in a high-rise building may be logistically complicated. The mailing address of a unit may not give any indication of the actual location of the unit in the building in which the unit is located (e.g., height from the ground, or which side of the building the unit is on). A unit may install a specialized platform for receiving deliveries via drone. The location of the platform may be verified using an inspection drone, and the mailing address of the unit may be mapped to the GPS coordinates of the platform. The specifications of the platform may also be verified using a drone, to verify compliance of the delivery platform with safety and security standards based on regulations such as, for example, building codes. The regulations may define where on a building the delivery platform may be installed, how far the delivery platform may extend from the building, a maximum cargo weight on the platform, a minimal distance between delivery platforms on the building, characteristics of a drone that may deliver cargo to the platform, environmental conditions (such as wind speed, rain condition, lightening condition) in which a drone is permitted to deliver to the platform, and a safety inspection frequency for the platform.

A type of drone may be selected to make a delivery to a particular platform based on the verified specifications of the platform and the characteristics of the package that is being delivered. The specifications of the platform may define, for example, a maximum size of a package that can be accepted by the platform, or any supported drone delivery mechanisms (e.g., that a drone having a retractable arm is necessary, based on the clearance that is required between the drone and the building). The specifications of the platform are taken into account for cargo packaging decisions, such that the package and drone are compatible with the platform.

Any appropriate delivery may be made to a delivery platform using a drone, including but not limited to one or more items purchased by a user from a seller, inter-office mail delivery, room service delivery at a hotel (e.g., food, amenities, or towels), delivery of hospital supplies, and inter-campus deliveries. A communication protocol (implemented using, for example, a transceiver) between the drone and the delivery platform may be provided to confirm the identity of the drone and establish the current status and load of the platform. An access token may be issued to a drone for a specific delivery to ensure authorized access to the platform by the specific drone. The drone may communicate with a transceiver associated with the platform to present the access token. Upon receiving the access token by the transceiver, the platform may allow the delivery (e.g., open a door so that the drone may place cargo inside the platform).

The platform transceiver may also communicate a status of the platform to a drone management system. For example, the platform may indicate to the drone management system whether the platform is currently capable of receiving further deliveries, or whether the platform is full. Any items that are already in the platform may be indicated. It may be determined whether an additional delivery will fit in the platform based on the size and weight of the items that are already in the platform.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
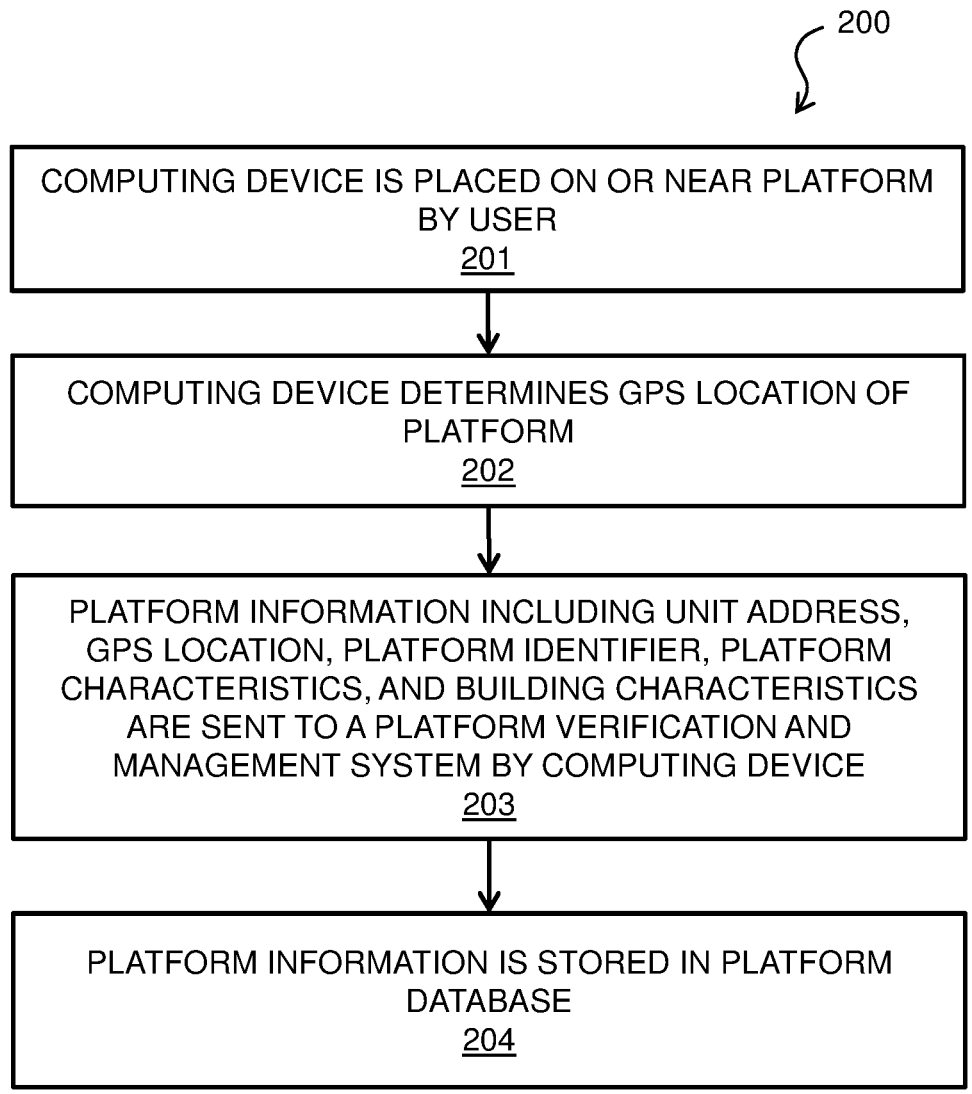
FIG. 2 is a process flow diagram of an example method for platform information gathering for delivery platform verification and management.

FIG. 2 is a process flow diagram of an example method for platform information gathering for delivery platform verification and management. The method 200 can be implemented with any suitable computing device, such as the computer system 100 of FIG. 1. In block 201, a computing device having GPS capability is placed on or near a platform by a user. The platform may be located at any appropriate location on a building, which may be a high rise building. In some embodiments, the computing device may be a mobile computing device, such as a smartphone, that is running an app that is configured to collect data regarding the platform. In block 202, the computing device determines a GPS location for the platform using a GPS sensor that is part of the computing device. In some embodiments, the computing device may determine a direction, or orientation, of the platform with respect to the building based on the orientation of the computing device in block 202, for example, by using sensors such as an accelerometer and gyroscope of the computing device In block 203, platform information, including the GPS location that was determined in block 202, and also a unit address (e.g., a mailing address) associated with the platform, platform characteristics, such as a make and model of the platform, and building characteristics that have been determined by the computing device are sent to a delivery platform verification and drone management system by the computing device. The platform information may include a unique identifier of the platform, dimensions of the platform, measurements regarding the position of the platform with respect to the building, and a clearance of the platform with respect to other platforms (or any other objects) on the building. The platform characteristics may further include, in some embodiments, one or more types of delivery that the platform is configured to receive (e.g., cold or hot deliveries, higher priority deliveries, or whether the platform is for letter mail or packages). The platform information may be sent by the computing device to the delivery platform verification and drone management system in any appropriate manner, via any appropriate network. In block 204, the delivery platform verification and drone management system stores the platform information received from the computing device in a platform information database. The platform information for a particular platform is stored in an entry for the platform in the platform information database that may be indexed via, for example, the unit address. Therefore, when a delivery to a particular unit address is requested, the platform information for the unit address may be obtained from the platform information database.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
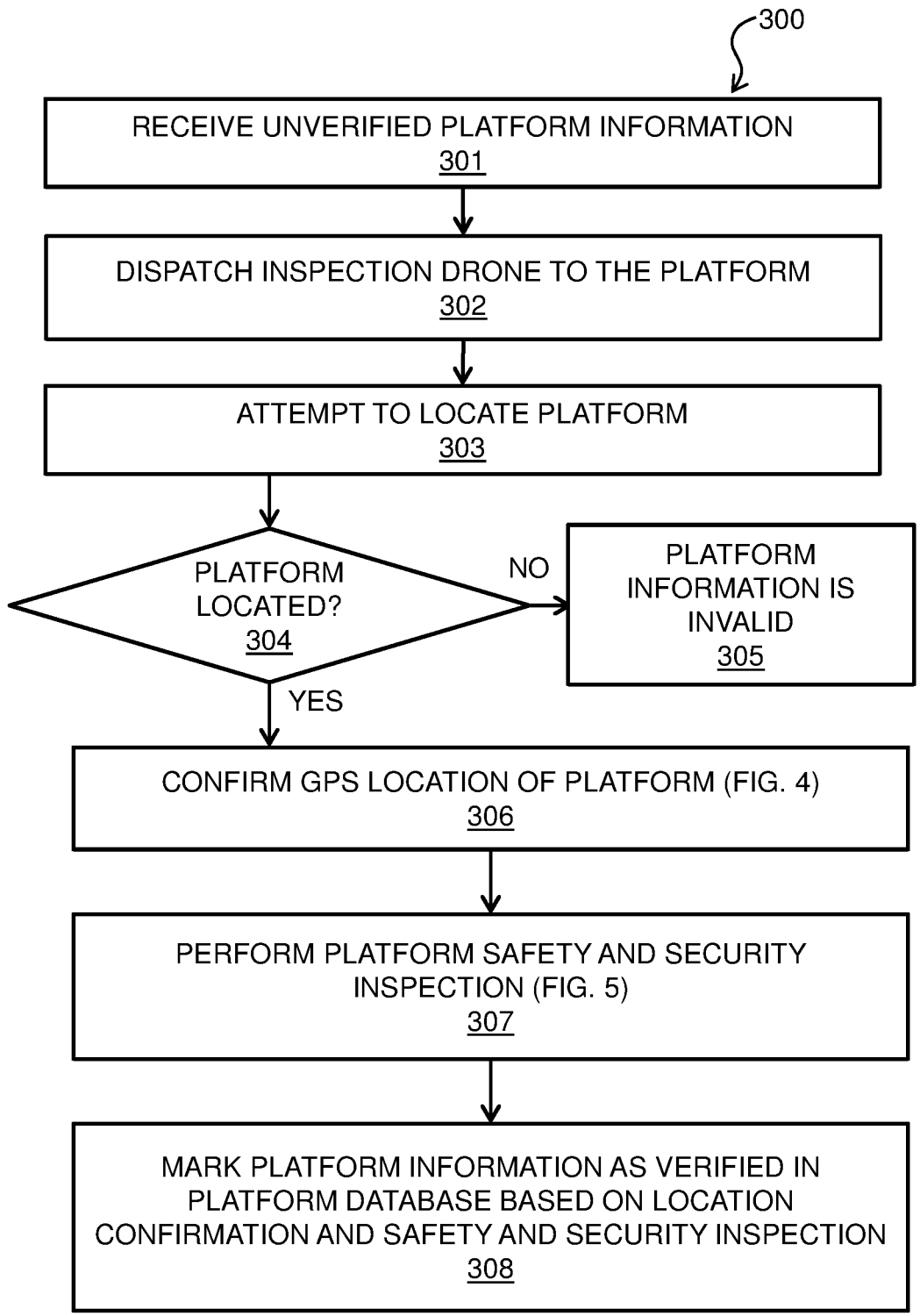
FIG. 3 is a process flow diagram of an example method for delivery platform verification and management.

FIG. 3 is a process flow diagram of an example method for delivery platform verification and management. The method 300 can be implemented with any suitable computing device, such as the computer system 100 of FIG. 1. In block 301, platform information is received by a delivery platform verification and drone management system. The platform information received in block 301 may have been collected by a computing device according to method 200 of FIG. 2. When the platform information is initially received, the platform information is considered to be unverified by the delivery platform verification and drone management system. Next, in block 302, an inspection drone is dispatched to the platform to perform verification of the platform information that was received in block 301. The inspection drone may be dispatched based on the GPS coordinates that were included in the platform information. In block 303, the inspection drone attempts to locate the platform based on the platform information. The platform may be located based on the GPS coordinates that were included in the platform information. In block 304, it is determined whether the platform was located by the inspection drone. If it is determined in block 304 that the platform was not located by the inspection drone, flow proceeds from block 304 to block 305, in which it is determined that the platform information that was received in block 301 is invalid, and method 300 ends.

If it is determined in block 304 that the platform was located by the inspection drone, flow proceeds from block 304 to block 306. In block 306, the inspection drone confirms the GPS location of the platform based a GPS sensor located in the inspection drone. Block 306 is discussed in further detail below with respect to method 400 of FIG. 4. In block 307, a safety and security inspection of the platform is performed. The safety and security inspection is discussed in further detail below with respect to method 500 of FIG. 5. In some embodiments, the safety and security inspection of block 307 may be performed by the inspection drone that was dispatched in block 302 of method 300, while in other embodiments the safety and security inspection may be performed by one or more other drones that are dispatched at a later time. In further embodiments, the safety and security inspection of block 307 may be performed periodically during the lifetime of the platform in order to ensure that the platform is working properly and to detect any changes to the platform. In some embodiments, the platform information may specify a time interval at which the safety and security inspection of block 307 is performed. In block 308, based on the GPS location of the platform being confirmed in block 306 and the safety and security inspection of the platform being successfully performed in block 307, the entry corresponding to the platform in the platform information database may be marked as verified. In some embodiments, multiple verification fields may be included in the entry corresponding to the platform. For example, the entry may be marked as address verified (e.g., in a first verification field) based on the location confirmation of block 306, and marked as safety verified (e.g., in a second verification field) based on the safety and security inspection of block 307. In some embodiments, the date of the safety and security inspection of block 307, and any measurements from the safety inspection, are included in the entry corresponding to the platform in the platform information database. In such an embodiment, the safety verification may expire based on a recommended safety inspection interval of the platform, such that the second verification field is changed to unverified after the safety inspection interval has elapsed. This may trigger another safety and security inspection of the platform to be performed according to FIG. 5.

In some embodiment, a mailing address may have multiple associated delivery platforms installed on the building. The multiple delivery platforms may be used by different tenants of the address in some embodiments, and/or the different platforms may have different capabilities or capacities. For example, a platform may be configured to keep a delivery cold (e.g., for grocery delivery) or keep a delivery warm (e.g., restaurant food delivery). In some embodiments, a relatively small platform may be used for letter mail, while a larger platform may be for package delivery. In some embodiments, a platform of the multiple platforms may be designated for high priority deliveries. Method 200 of FIG. 2 and method 300 of FIG. 3 may be performed for each of the multiple delivery platforms. In block 203 of method 200 of FIG. 2, the computing device may send the characteristics of the platform to the delivery platform verification and management system, and in method 400 of FIG. 4, the characteristics of the platform may be confirmed. Each of the respective entries for the multiple delivery platforms may be associated with the same mailing address in the platform information database. The respective entry for each delivery platform may include the additional characteristics of the platform (e.g., "Attention: high priority", "Attention: cold storage"), and a platform of the multiple platforms may be selected for a particular delivery to the mailing address based on the type of delivery and the platform characteristics. This is discussed in further detail below with respect to FIG. 6.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
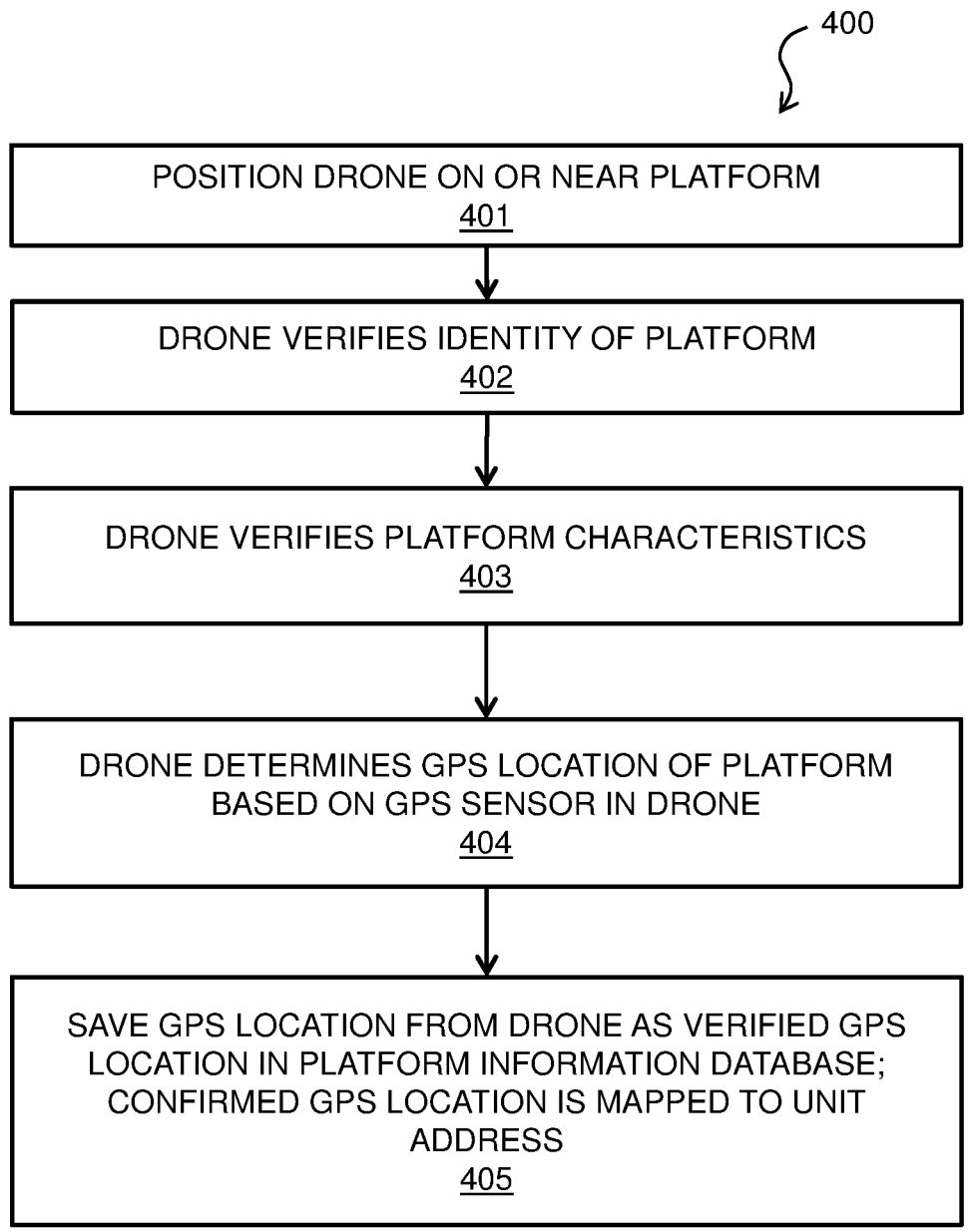
FIG. 4 is a process flow diagram of an example method for GPS location confirmation and address mapping for delivery platform verification and management.

FIG. 4 is a process flow diagram of an example method for GPS location confirmation and address mapping for delivery platform verification and management. The method 400 can be implemented with any suitable computing device, such as the computer system 100 of FIG. 1. Method 400 may be performed in block 306 of FIG. 3. In block 401, an inspection drone is positioned on or near the platform. In block 402, the inspection drone verifies the identity of the platform upon which it is positioned to ensure that the platform that the drone is inspecting is the same platform described by the platform information. In some embodiments, the platform may provide an identifier to the inspection drone in block 402. For example, the platform may have a radio frequency identification (RFID) tag that is detected by the inspection drone, or the platform may have an associated transceiver that transmits an identifier to the inspection drone. In block 403, in some embodiments, the inspection drone may verify any characteristics of the platform. For example, the inspection drone may verify that the platform is configured to keep a delivery hot or cold, or is configured to receive a specific type of delivery. In block 404, the inspection drone determines a GPS location for the platform based on a GPS sensor in the inspection drone. The GPS sensor located in the drone may be more accurate than the GPS sensor in the computing device described above with respect to FIG. 2 in some embodiments. In block 405, the GPS location that was determined in block 403 is saved in the entry corresponding to the platform in the platform information database by the delivery platform verification and drone management system. The GPS location is mapped to the mailing address of the unit that is saved in the entry in the platform information database, so that if a drone delivery to the mailing address is requested, a drone may be dispatched to the associated GPS coordinates in the entry in the platform information database by the delivery platform verification and drone management system.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
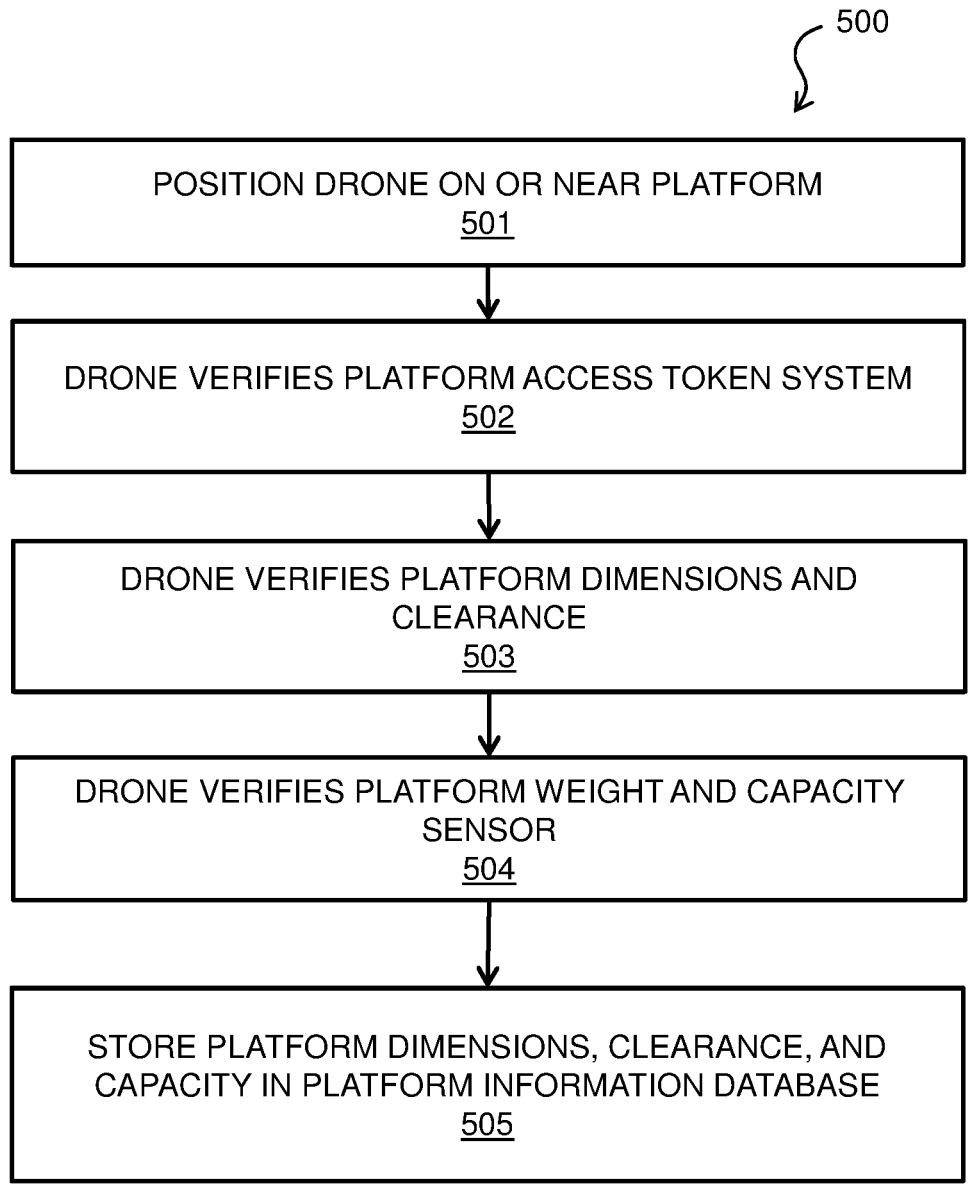
FIG. 5 is a process flow diagram of an example method for platform inspection for delivery platform verification and management.

FIG. 5 is a process flow diagram of an example method for platform inspection for delivery platform verification and management. The method 500 can be implemented with any suitable computing device, such as the computer system 100 of FIG. 1. Method 500 of FIG. 5 may be performed in block 307 of FIG. 3. In some embodiments, method 500 of FIG. 5 may be performed by the inspection drone that was dispatched in block 302 of method 300 of FIG. 3. In other embodiments, method 500 of FIG. 5 may be performed at a later time by another drone. Method 500 of FIG. 5 may also be repeated at intervals throughout the lifetime of the platform, in order to ensure that the platform continues to work properly over time. In block 501, an inspection drone is positioned on or near the platform. In block 502, the drone verifies that an access token system of the platform is functional. For example, the platform may have an associated transceiver that is configured to communicate with a drone to determine whether the drone is authorized to access the platform. The transceiver may be any appropriate type of network in various embodiments, including but not limited to broadband, WiFi, or RFID. In some embodiments, the drone may have an access token that is configured to be used once. The access token may have been issued for the inspection by the delivery platform verification and management system and communicated to both the drone and the transceiver on the platform. The drone may transmit the token to the platform when the drone arrives at the platform, and the platform may verify the drone based on the access token. In some embodiments, the platform may open a door in the platform based on receiving the access token.

In some embodiments of block 502, the drone may transmit an incorrect token to the platform, and verify that the platform did not open the door based on receiving the incorrect access token. In some embodiments of block 502, the delivery platform verification and management system may verify that the platform captures a photo or video of the drone, and keeps a record of the drone's information such as the drone's sender information and the drone's unique identifier. In some embodiments, the delivery platform may determine based on safety conditions whether a door in the platform should be opened in response to receiving the access token. Safety conditions may include any of the current wind speed, precipitation, and whether the delivery drone is too close to the platform or within a prescribed distance from the platform. These safety conditions may be detected by sensors on the platform (such as depth sensing camera) or other sources such as the weather condition from the internet as determined by a local weather station. The inspection drone can verify the platform's operation by positioning itself at different distances from the platform in various embodiments.

In block 503, the drone verifies the platform dimensions and clearances. The information that is verified by the drone in block 503 may include any appropriate measurements regarding the platform, such as the dimensions of the platform, measurements regarding the position of the platform with respect to the building (such as height off the ground and from either side of the building), and a clearance of the platform with respect to other platforms on the building. A distance to any other objects on the building, including but not limited to windows that open outward, balconies, air conditioners or fire escapes, may also be determined by the drone in block 503.

In block 504, the inspection drone may verify that the platform's weight sensor is functional. The platform may include a weight sensor that determines the weight of any items that are currently in the platform, so as to ensure that the platform's weight capacity is not exceeded. In some embodiments, the inspection drone may place an object having a predetermined weight on the platform, and verify via the transceiver that the platform's weight sensor has correctly detected the predetermined weight. In further embodiments, the drone may place a relatively heavy item in the platform and observe the behavior of the platform, e.g., if the platform moves under the relatively heavy weight. In further embodiments, the drone can request to deliver a package with a weight that is more than platform's current capacity. For example, the inspection drone may drop off a package of 5 pounds, then request a second delivery of a package of 15 pounds to a platform having a maximum capacity of 10 pounds. In such an embodiment, the drone may verify that the platform rejects the second delivery.

In further embodiments of block 504, the inspection drone may verify that the platform's capacity sensor is functional. The capacity sensor may be a camera or infrared light that determines the occupancy of existing packages in the platform Furthermore, the platform may be designed with a slope such that delivered packages will slide to the lower end of the delivery platform through gravity, or the platform might be equipped with a conveyer system to optimize space utilization by moving delivered packages to one end of delivery platform and rotate the package. The capacity sensor together with the known inner dimension of the delivery platform can determine space available for new delivery. In some embodiments, the drone may request to deliver an object having predetermined dimensions, and verify via the transceiver that the platform has correctly determined the available space. In some embodiments, the sloped delivery platform or the conveyer system may move the delivered package off of the platform, and in some cases directly into the building. In further embodiments, the inspection drone may request to deliver a package with dimensions that are more than the platform's current capacity. For example, the inspection drone may deliver a first package, and then request a second delivery of a package that would cause the platform's capacity to be exceeded. In such an embodiment the inspection drone may verify that the platform rejects the second delivery based on the capacity sensor. In some embodiments, the delivery platform capacity may depend on how the package is dropped off, where the height, width, and depth of the package are provided using the specifications of the platform (e.g., the height is along the vertical line of the platform door, and the width is along the horizontal line of the platform door). In some embodiments, the delivery platform capacity will not depend on how the package is dropped off; rather, the delivery platform may consider a widest length of the package as the width, height and depth of the package.

In block 505, the verified data of the platform that was determined by the drone in blocks 502-505 is transmitted to the delivery platform verification and drone management system and stored in the entry corresponding to the platform in the platform information database.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
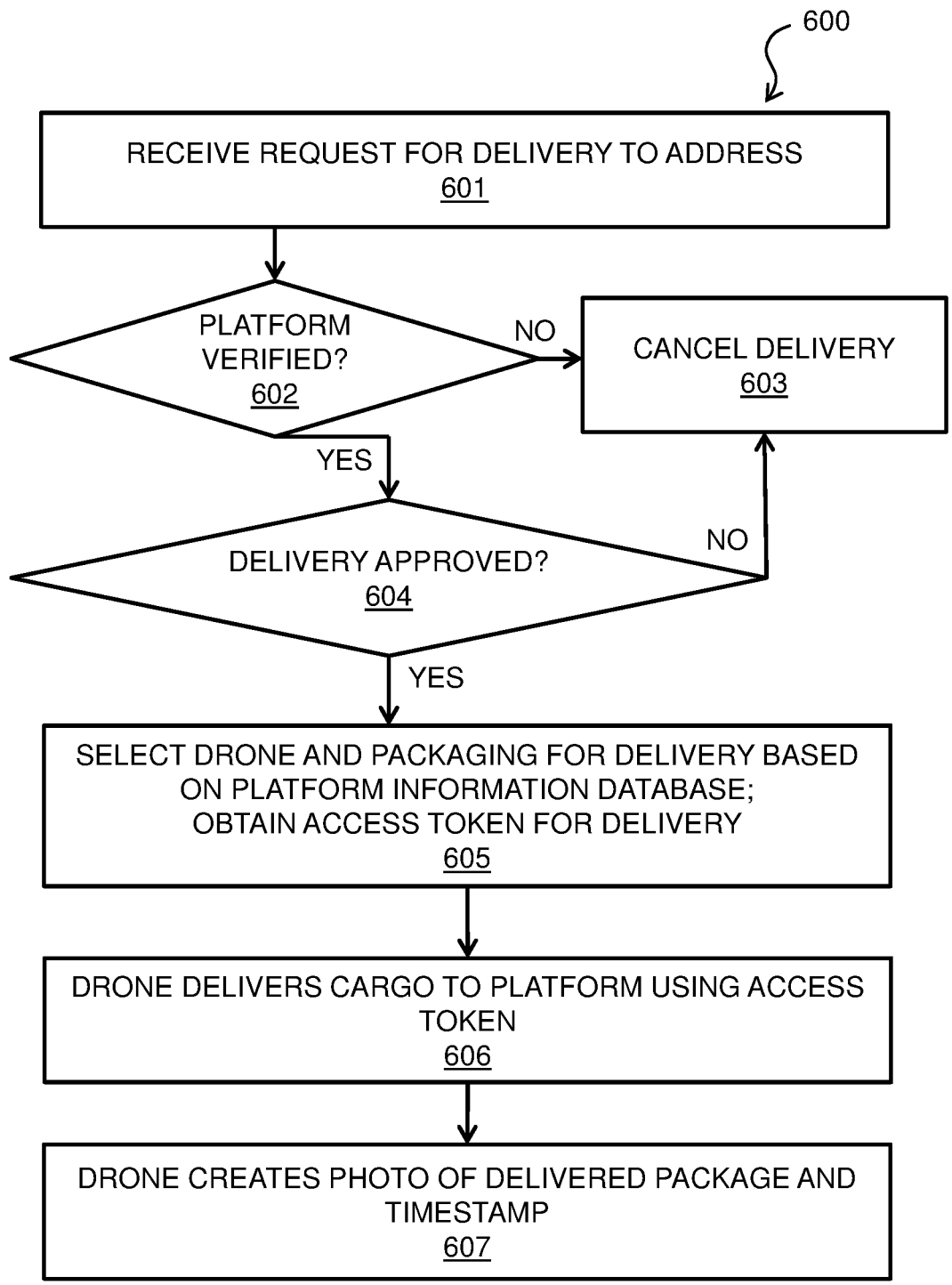
FIG. 6 is a process flow diagram of an example method for cargo delivery for delivery platform verification and management.

FIG. 6 is a process flow diagram of an example method for cargo delivery for delivery platform verification and management. The method 600 can be implemented with any suitable computing device, such as the computer system 100 of FIG. 1. In block 601, a request for a drone delivery to a mailing address is received by a drone dispatcher that is in communication with the delivery platform verification and drone management system. The request may include a mailing address of a unit associated with a platform. In block 602, the drone dispatcher looks up the platform associated with the mailing address in the platform information database, and determines whether an entry corresponding to the platform has been marked as verified according to method 300 of FIG. 3. In some embodiments, the entry may have a first verification field corresponding to address verification as performed by method 400 of FIG. 4, and a second verification field corresponding to safety and security verification as performed by method 500 of FIG. 5. In some embodiments, the entry corresponding to the platform is determined to be verified if both the first and second verification fields are marked as verified. If it is determined in block 602 that the entry corresponding to the platform has not been marked as verified, flow proceeds to block 603, in which the delivery is canceled, and method 600 ends.

If it is determined in block 602 that the entry corresponding to the platform has been verified, flow proceeds from block 602 to block 604, in which it is determined whether the delivery to the platform is approved. It is determined in block 604 whether the cargo requested by the delivery will fit in the platform. In some embodiments, the determination of block 604 may be made based on the platform information database, which may include data regarding the contents, weight capacity, and dimensions of the platform. The current contents of the platform may be transmitted from the platform to the platform information database via a transceiver of the platform based on, for example, a weight sensor in the platform. For example, if there are one or more items already located in the platform, the additional item requested for delivery in block 601 may not fit, or the additional item may cause the platform's weight capacity to be exceeded. A record of deliveries to the platform may also be examined in block 604 and compared to the data from the weight sensor of the platform, to determine the weight and dimensions of any items that may already be in the platform. If it is determined in block 604 that the delivery will not fit in the platform, the delivery is not approved, so flow proceeds to block 603, and the delivery is canceled. Current environmental conditions may also be evaluated in block 604 to determine whether the delivery should be made. For example, wind speed or precipitation may render the current conditions unsuitable for drone delivery. In some embodiments, the drone dispatcher may consult the delivery platform for suitability of delivery based on current environmental conditions (e.g. wind speed), or the drone dispatcher may determine the suitability of delivery using third party information such as the current weather conditions reported by a local weather station. If it is determined in block 604 that environmental conditions are not appropriate for the delivery, the delivery is not approved, so flow proceeds to block 603 and the delivery may be cancelled.

In some embodiments, a delivery platform may maintain a queue of delivery requests. A delivery may be approved in block 604 based on the expected delivery time of the package and the queue of delivery requests. For example, if a drone dispatcher indicates that a package will be delivered in 10 hours, the drone dispatcher may defer approval of the delivery until 1 hour before the delivery, or until 5 minutes before the drone is ready to dispatch. The queue of delivery requests may track one or more packages that are ready but not approved for delivery, and one or more packages that has been approved for delivery but not yet delivered. When considering approval of additional delivery, the weight and dimensions of the one or more packages that have approved for delivery but not yet delivered may be taken into account.

In some embodiments of block 604, there may be multiple platforms having different characteristics associated with the mailing address in the platform information database. In such embodiments, a particular platform of the multiple delivery platforms that belong to the same mailing address may be identified as being appropriate for the delivery in block 604, and it is determine whether the delivery is approved based on the characteristics of the particular platform. The particular platform may be selected based on the characteristics of the delivery, and of the platform (e.g., a grocery delivery may be delivered to a refrigerated platform, a delivery for a particular tenant of the address may be sent to a platform associated with that tenant, or a high priority delivery may be delivered to a platform that is designated to receive high priority deliveries). The GPS coordinates of the selected platform of the multiple platforms that belong to the delivery address may be provided to the selected drone in block 605, and the access token may be issued for the particular platform in block 605.

If it is determined in block 604 that the delivery to the platform is approved, flow proceeds to block 605. In block 605, a drone type and a packaging type are selected for the delivery, and an access token is issued for the delivery. The drone type and packaging type may be selected based on the physical characteristics of the platform that are stored in the platform information database. In some embodiment, the choice of packaging type might be determined at a warehouse (e.g. an online retailer warehouse) or packaging location (e.g. kitchen for a takeout). The packaging type may be recommended based on the physical characteristics of the delivery platform and provided to the retailer at the time of order, or the recommended packaging type (e.g., size of the deliver package) may be dynamically updated based on the latest capacity information of the delivery platform. The access token may be issued for the delivery by the delivery platform verification and management system and communicated to both the drone and the transceiver on the platform.

In block 606, the selected drone navigates to the platform based on the GPS coordinates that are mapped to the mailing address in the entry in the platform information database, and delivers the cargo to the platform using the access token. The drone may transmit the token to the platform when the drone arrives at the platform, and the platform may verify the drone based on the access token. In some embodiments, the delivery platform may open a door to receive the cargo based on receiving the access token from the delivery drone. In block 607, the drone creates a photograph of the delivered package in the platform and saves the photograph with a time stamp. The photograph and time stamp may be saved in a platform information database, and may also be provided to a user as proof of delivery. The presence of the package in the platform may be used to determine whether further deliveries to the platform may be made. When the package is removed from the platform by a user, a weight sensor of the platform may cause a notification to the delivery platform verification and drone management system of the updated state of the platform, i.e., that the package is no longer located in the platform. In some embodiments, the delivery platform might determine that the new delivery will not fit in the platform at the time of the delivery in block 606, and the platform may reject the delivery. In such an embodiment, a notification may be sent to the user to remove packages from the delivery platform.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Figure 7A:
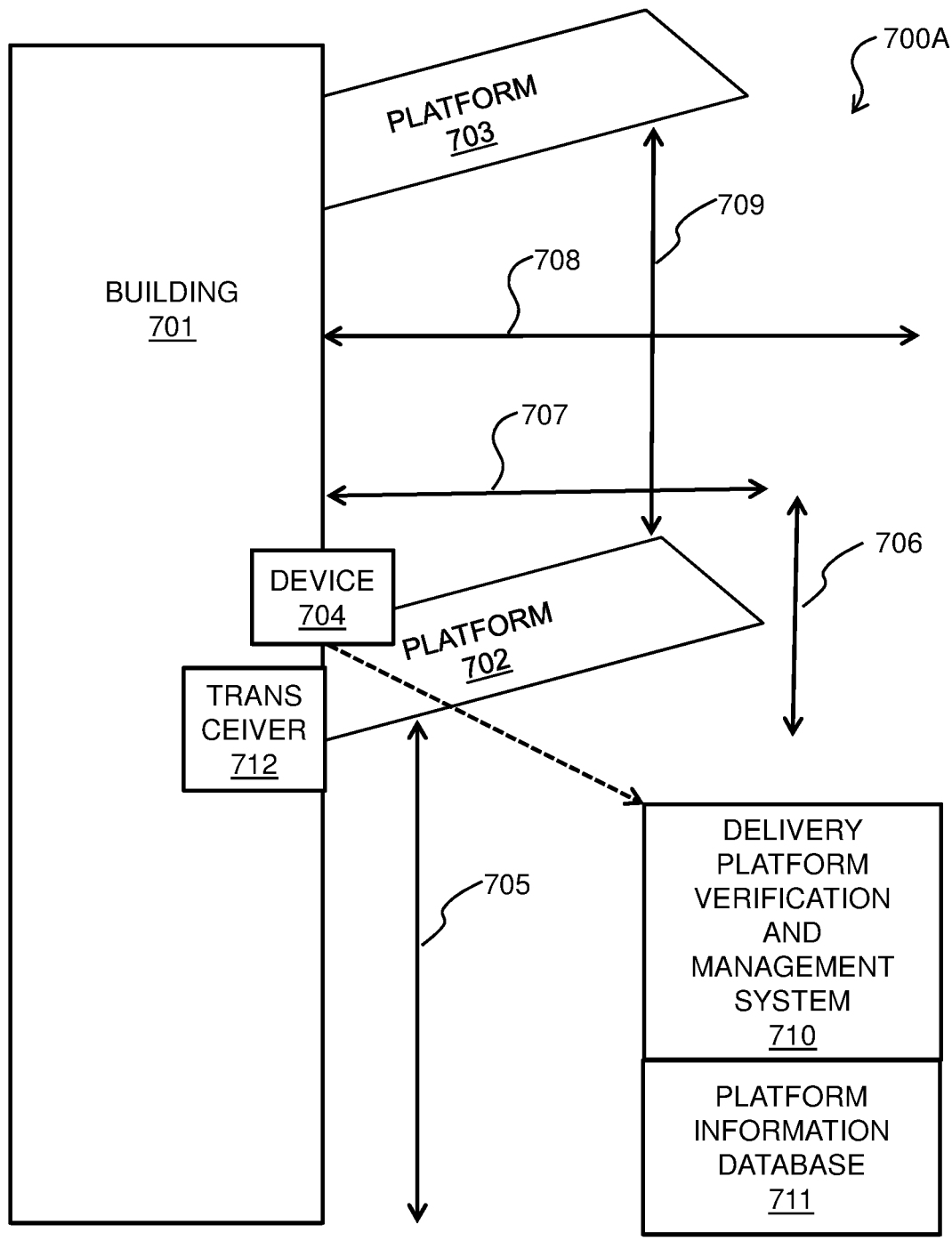
FIGS. 7A-C are block diagrams of example systems for delivery platform verification and management.
Figure 7B:
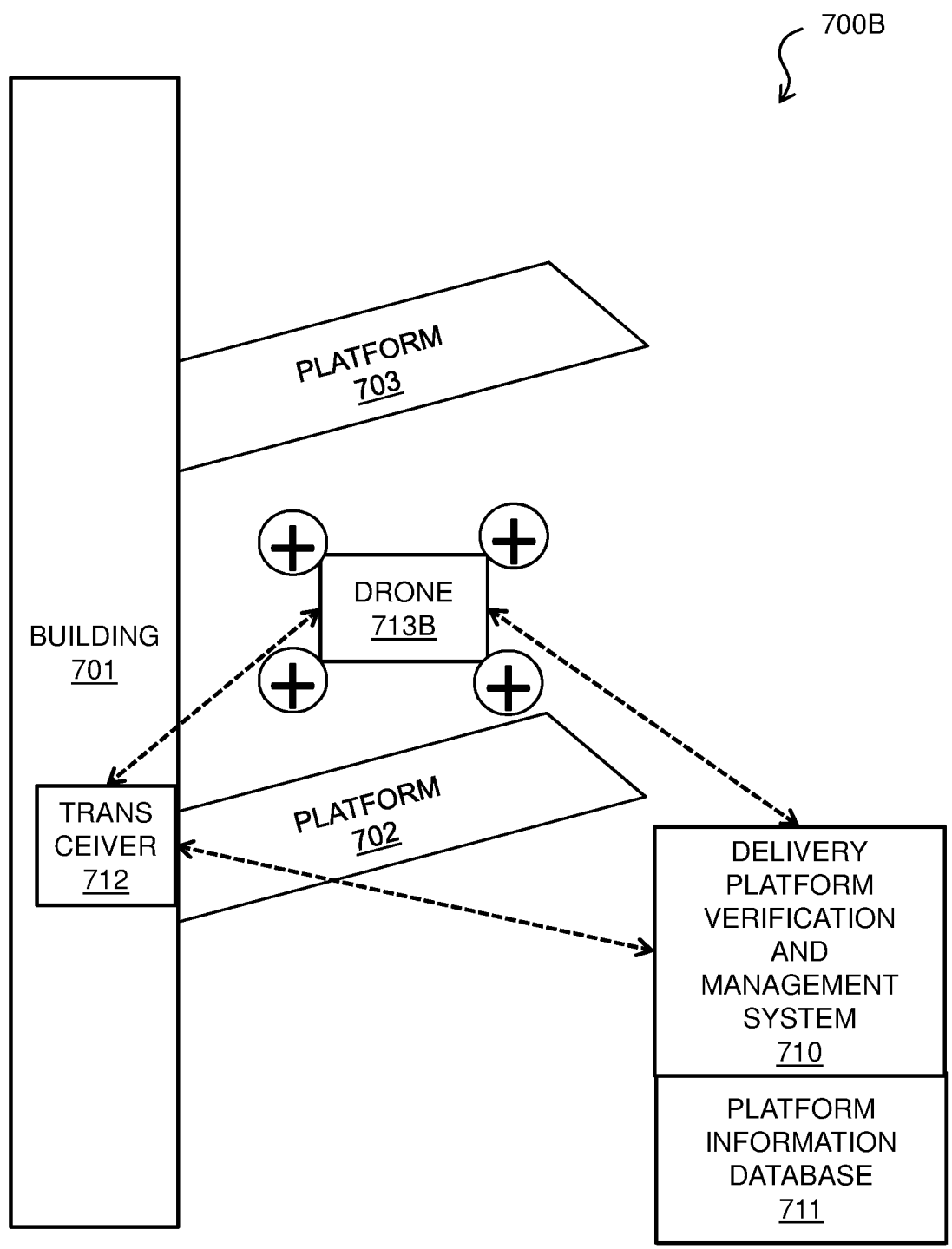
Figure 7C:
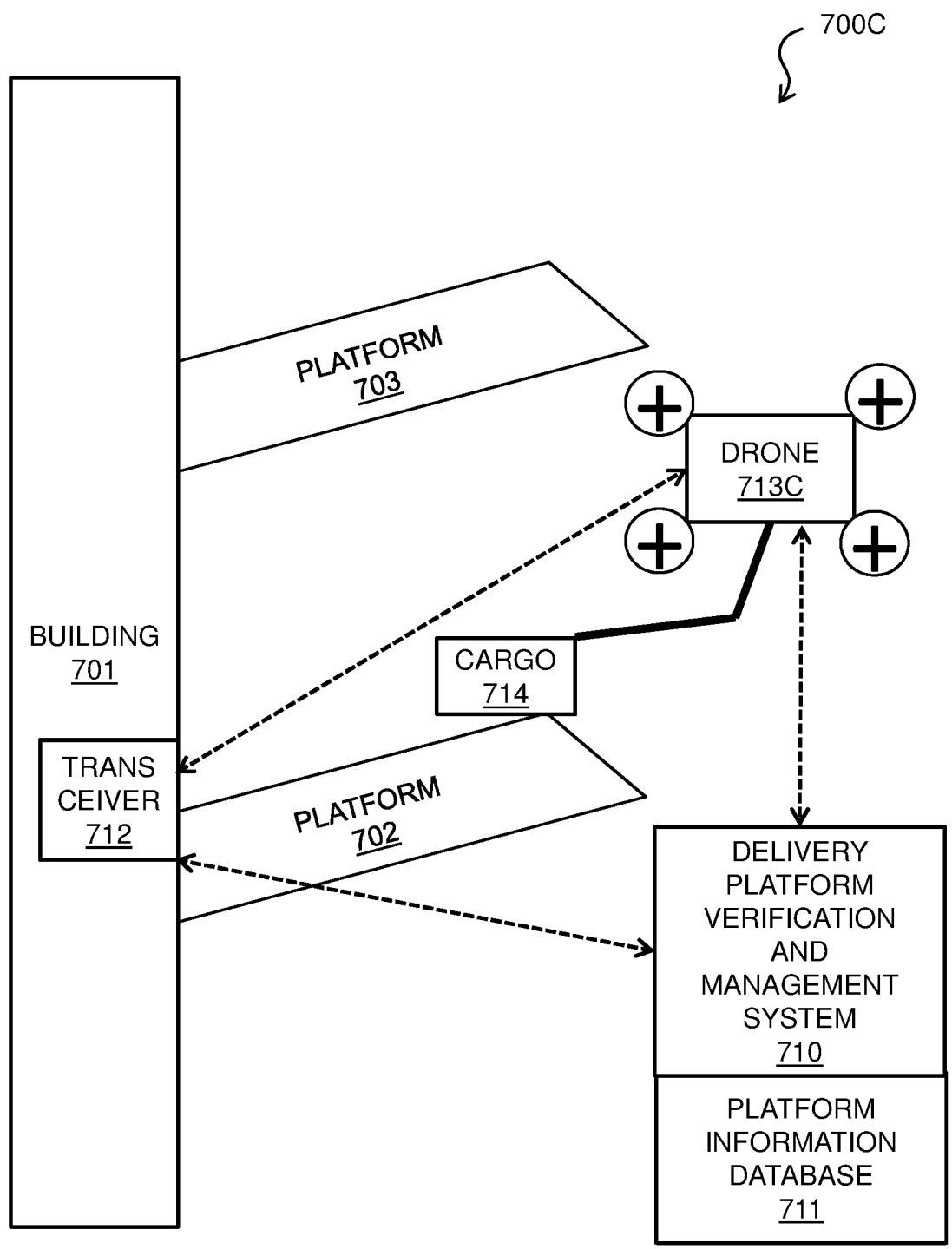

FIGS. 7A-C are block diagrams of example systems 700A-C for delivery platform verification and management as described above with respect to FIG. 2-6. System 700A of FIG. 7A illustrates an example of an embodiment of method 200 of FIG. 2. Computing device 704 may comprise any appropriate computing system, such as computer system 100 of FIG. 1. Computing device 704 determines GPS coordinates for platform 702 on building 701. Platform 702 is also located on building 701. Platform 702 has an associated transceiver 712. The transceiver 712 may communicate with drones as described above with respect to FIGS. 2-6, and also with platform verification and drone management system 710. Platform verification and drone management system 710 may comprise any appropriate computing system, such as computer system 100 of FIG. 1. The computing device 704 is placed by a user on the platform 702 when the platform is initially being configured for usage, and may gather and transmit platform information, including GPS coordinates, the mailing address of the unit associated with the platform 702, platform characteristics, and building characteristics to a delivery platform verification and drone management system 710. The delivery platform verification and drone management system 710 maintains platform information database 711; the platform information is stored in an entry in the platform information database 711. The entry in the platform information may further include, but is not limited to, a height 705 of the platform off the ground; a width 706 of the platform, a length 707 of the platform, a clearance 708 from the building 701 that must be maintained by a drone; and a clearance 709 to another platform 703. FIG. 7A is shown for illustrative purposes only; any appropriate measurements regarding the platform may be stored in a platform information database. Further, a platform may have any appropriate shape and orientation with respect to a building. The delivery platform verification and drone management system 710 and the platform information database 711 may be located at any appropriate location with respect to the building 701 and with respect to each other, and may communicate with the computing device 704 in any appropriate manner. Transceiver 712 may be any appropriate type of transceiver, and may be located at any appropriate location with respect to the platform 702.

FIG. 7B illustrates examples of, in various embodiments, method 300 of FIG. 3, method 400 of FIG. 4, and method 500 of FIG. 5. The drone 713B may be an inspection drone. The drone 713B may determine GPS coordinates of the platform 702, and transmit those GPS coordinates to the delivery platform verification and drone management system 710 for storage in the platform information database 711 as described with respect to FIG. 4. The drone 713B may also communicate with transceiver 712 to identify the platform 702 as described with respect to FIG. 4, and/or to determine that an access token system of the platform 702 is working as described with respect to FIG. 5. The drone 713B may also verify the dimensions and clearances of the platform 702, and verify that a weight sensor of the platform 702 is working, as described with respect to FIG. 5. Any characteristics of the platform, including but not limited to a height 705 of the platform off the ground; a width 706 of the platform, a length 707 of the platform, a clearance 708 from the building 701 that must be maintained by a drone; and a clearance 709 to another platform 703 as shown in FIG. 7A, may be determined by the drone 713B and stored in the platform information database 711.

FIG. 7C illustrates an example of an embodiment of method 600 of FIG. 6. Drone 713C may be a delivery drone, having a retractable arm for delivering cargo 714 to the platform 702, in some embodiments. Drone 713C may transmit an access token to the transceiver 712 in order to access the platform 702 for the delivery of cargo 714. In some embodiments, the platform 702 may open a door in the platform 702 in response to receiving the access token so that the drone 713C may place the cargo 714 inside the platform. The type of the drone 713C may have been selected by a drone dispatcher in conjunction with the delivery platform verification and drone management system 710 based on information in the entry in the platform information database 711 corresponding to platform 702. The drone 713C may have located the platform 702 by navigating to the GPS coordinates given for the entry corresponding to the platform 702 in the platform information database 711. In some embodiments, a plurality of drone dispatchers may be in communication with the delivery platform verification and drone management system 710.

It is to be understood that the block diagrams of FIGS. 7A-C are not intended to indicate that the systems 700A-C is to include all of the components shown in FIGS. 7A-C. Rather, the systems 700A-C can include any appropriate fewer or additional components not illustrated in FIGS. 7A-C (e.g., buildings, platforms, drones, computing devices, computer networks, transceivers, etc.). Further, the embodiments described herein with respect to system 700A-C may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor;
   a first inspection drone communicatively coupled to the processor; and
   a second inspection drone communicatively coupled to the processor, wherein the processor is configured to:
   receive a unit mailing address and first global positioning system (GPS) coordinates, the unit mailing address and the first GPS coordinates being associated with a delivery platform, from a computing device;
   based on receiving the unit mailing address and the first GPS coordinates, dispatch the first inspection drone to the delivery platform based on the first GPS coordinates;
   receive second GPS coordinates associated with the delivery platform from the first inspection drone;
   associate the second GPS coordinates with the unit mailing address in an entry corresponding to the delivery platform in a platform information database;
   dispatch the second inspection drone to the delivery platform based on the second GPS coordinates, wherein the second inspection drone is configured to perform a safety and security inspection of the delivery platform; and
   based on the second inspection drone performing the safety and security inspection of the delivery platform, mark the entry corresponding to the delivery platform in the platform information database as verified.

2. The system of claim 1, wherein the processor is further configured to:
   receive a platform measurement from the computing device, wherein the first inspection drone verifies the platform measurement that was received from the computing device.

3. The system of claim 1, wherein the safety and security inspection comprises:
   issuing a first access token to the second inspection drone; and
   providing the first access token to a transceiver of the delivery platform by the second inspection drone, wherein the delivery platform opens a door based on receiving the first access token.

4. The system of claim 1, wherein the safety and security inspection comprises:
   placing an item having a predetermined weight in the delivery platform; and
   verifying that a weight sensor of the delivery platform detects the predetermined weight of the item.

5. The system of claim 1, wherein the processor is further configured to:
   receive a request for a delivery to the unit mailing address;

based on receiving the request for the delivery to the unit mailing address, determine whether the entry corresponding to the delivery platform in the platform information database is marked as verified;

based on determining that the entry corresponding to the delivery platform in the platform information database is not marked as verified, cancel the delivery; and based on determining that the entry corresponding to the delivery platform in the platform information database is marked as verified, dispatch a delivery drone to the delivery platform based on the second GPS coordinates.

6. The system of claim 5, wherein the processor is further configured to:

issue a second access token to the delivery drone, wherein the delivery drone provides the second access token to a transceiver of the delivery platform before making the delivery, and wherein the delivery platform opens a door based on receiving the second access token.

7. A computer-implemented method, comprising:

receiving, by a processor, a unit mailing address and first global positioning system (GPS) coordinates, the unit mailing address and the first GPS coordinates being associated with a delivery platform, from a computing device;

based on receiving the unit mailing address and the first GPS coordinates, dispatching, by the processor, a first inspection drone to the delivery platform based on the first GPS coordinates;

receiving, by the processor, second GPS coordinates associated with the delivery platform from the first inspection drone;

associating, by the processor, the second GPS coordinates with the unit mailing address in an entry corresponding to the delivery platform in a platform information database;

dispatching a second inspection drone to the delivery platform based on the second GPS coordinates, wherein the second inspection drone is configured to perform a safety and security inspection of the delivery platform; and based on the second inspection drone performing the safety and security inspection of the delivery platform, marking the entry corresponding to the delivery platform in the platform information database as verified.

8. The computer-implemented method of claim 7, further comprising:

receiving a platform measurement from the computing device, wherein the first inspection drone verifies the platform measurement that was received from the computing device.

9. The computer-implemented method of claim 7, wherein the safety and security inspection comprises:

issuing a first access token to the second inspection drone; and providing the first access token to a transceiver of the delivery platform by the second inspection drone, wherein the delivery platform opens a door based on receiving the first access token.

10. The computer-implemented method of claim 7, wherein the safety and security inspection comprises:

placing an item having a predetermined weight in the delivery platform; and verifying that a weight sensor of the delivery platform detects the predetermined weight of the item.

11. The computer-implemented method of claim 7, further comprising:

receiving a request for a delivery to the unit mailing address;

based on receiving the request for the delivery to the unit mailing address, determining whether the entry corresponding to the delivery platform in the platform information database is marked as verified;

based on determining that the entry corresponding to the delivery platform in the platform information database is not marked as verified, canceling the delivery; and based on determining that the entry corresponding to the delivery platform in the platform information database is marked as verified, dispatching a delivery drone to the delivery platform based on the second GPS coordinates.

12. The computer-implemented method of claim 11, further comprising:

issuing a second access token to the delivery drone, wherein the delivery drone provides the second access token to a transceiver of the delivery platform before making the delivery, and wherein the delivery platform opens a door based on receiving the second access token.

13. An apparatus, comprising:

a processor;

a first inspection drone communicatively coupled to the processor;

a second inspection drone communicatively coupled to the processor; and program code executable by the processor to cause the processor to perform:

receive a unit mailing address and first global positioning system (GPS) coordinates, the unit mailing address and the first GPS coordinates being associated with a delivery platform, from a computing device;

based on receiving the unit mailing address and the first GPS coordinates, dispatch the first inspection drone to the delivery platform based on the first GPS coordinates;

receive second GPS coordinates associated with the delivery platform from the first inspection drone;

associate the second GPS coordinates with the unit mailing address in an entry corresponding to the delivery platform in a platform information database;

dispatch the second inspection drone to the delivery platform based on the second GPS coordinates, wherein the second inspection drone is configured to perform a safety and security inspection of the delivery platform; and based on the second inspection drone performing the safety and security inspection of the delivery platform, mark the entry corresponding to the delivery platform in the platform information database as verified.

14. The apparatus of claim 13, further comprising program code executable by the processor to cause the processor to:

receive a platform measurement from the computing device, wherein the first inspection drone verifies the platform measurement that was received from the computing device.

15. The apparatus of claim 13, wherein the safety and security inspection comprises:

issuing a first access token to the second inspection drone; and providing the first access token to a transceiver of the delivery platform by the second inspection drone, wherein the delivery platform opens a door based on receiving the first access token.

16. The apparatus of claim 13, wherein the safety and security inspection comprises:
  placing an item having a predetermined weight in the delivery platform; and
  verifying that a weight sensor of the delivery platform detects the predetermined weight of the item.

17. The apparatus of claim 13, further comprising program code executable by the processor to cause the processor to:
  receive a request for the delivery to the unit mailing address;
  based on receiving the request for the delivery to the unit mailing address, determine whether the entry corresponding to the delivery platform in the platform information database is marked as verified;
  based on determining that the entry corresponding to the delivery platform in the platform information database is not marked as verified, cancel the delivery; and
  based on determining that the entry corresponding to the delivery platform in the platform information database is marked as verified, dispatch a delivery drone to the delivery platform based on the second GPS coordinates.

* * * * *